United States Patent [19]

Pasion et al.

[11] Patent Number: 4,905,404
[45] Date of Patent: Mar. 6, 1990

[54] FLOATING FISH BASKET

[76] Inventors: Randall J. Pasion, 94-1065 Puana St.; Sherwin K. Miyamoto, 94-1069 Puana St., both of Waipahu, Hi. 96797

[21] Appl. No.: 251,254

[22] Filed: Sep. 30, 1988

[51] Int. Cl.$^4$ ............................................. A01K 71/00
[52] U.S. Cl. ........................................ 43/55; 43/54.1; 43/56
[58] Field of Search ................. 43/44.99, 54.1, 55, 43/56; 441/11, 36, 89

[56] References Cited

U.S. PATENT DOCUMENTS

| | | | |
|---|---|---|---|
| D. 257,377 | 10/1980 | Andrews | D22/22 |
| 1,110,892 | 9/1914 | Cather | 43/56 |
| 1,332,171 | 2/1920 | Endreson | 441/36 |
| 2,030,793 | 2/1936 | Horn | 43/55 |
| 2,241,314 | 5/1941 | Mohler | 43/55 |
| 2,739,410 | 3/1956 | Budnick | 43/55 |
| 2,790,266 | 4/1957 | Williamson | 43/55 |
| 3,478,463 | 11/1969 | Ruter | 43/55 |
| 3,524,278 | 8/1970 | Wolfe | 43/55 |
| 3,717,124 | 2/1973 | Jacobs | 43/55 |
| 4,570,374 | 2/1986 | Baxley | 43/55 |
| 4,794,723 | 1/1989 | Arnold et al. | 43/54.1 |

*Primary Examiner*—Nicholas P. Godici
*Assistant Examiner*—James Miner
*Attorney, Agent, or Firm*—Jerry T. Kearns

[57] ABSTRACT

A floating fish basket for use by divers and spear fishermen has a frame removably secured to a flotation ring. A coaxial wire mesh bag is suspended from the frame within the flotation ring for containing fish and other sea animals. The frame and mesh bag have aligned openings which may be selectively closed by a pivotal door mounted by a hinge on the frame. A chain extends between the bottom of the bag and the door and is operative upon opening the door to partially axially collapse the mesh bag to enable an individual to have access to bottom portions of the bag. The chain may be adjusted in length to shorten the axial extent of the bag for use in shallow water. A socket on the frame is provided for mounting a staff of a diving flag. The flotation ring may be captured between upper and lower frame members secured by threaded fasteners or alternatively secured by frictional engagement within a frame recess or held in place by VELCRO fastening straps.

2 Claims, 4 Drawing Sheets

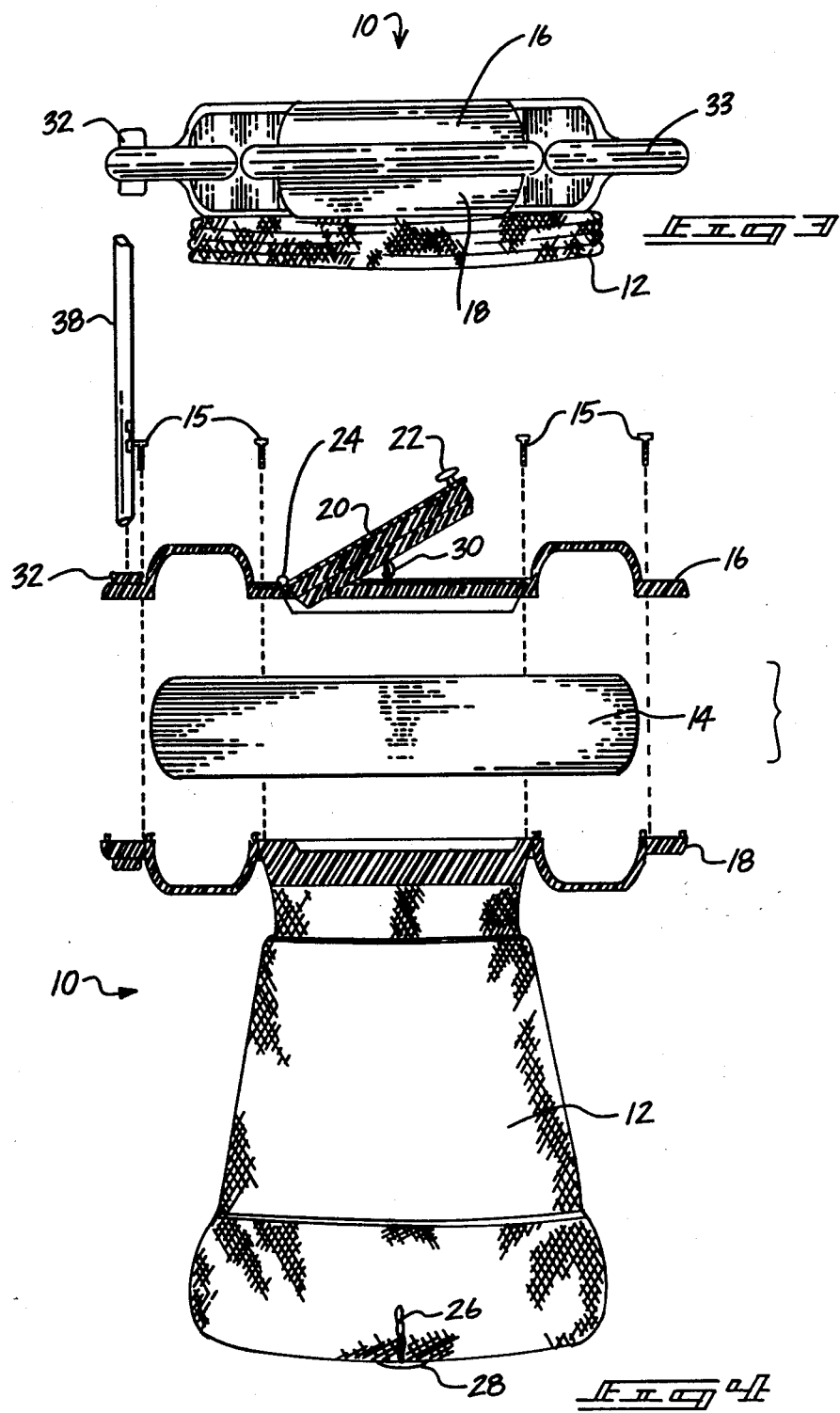

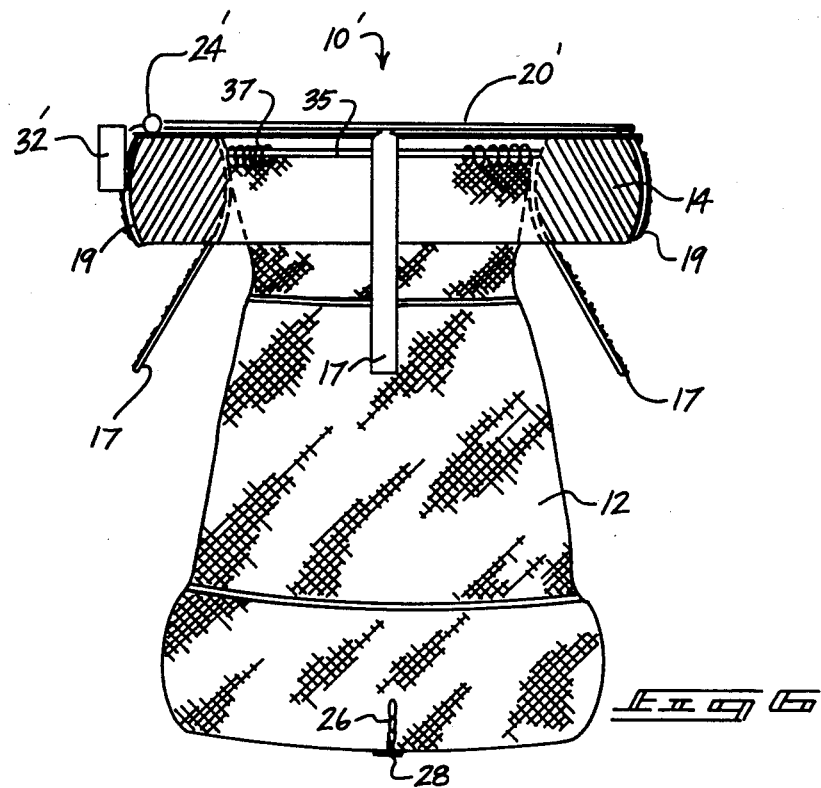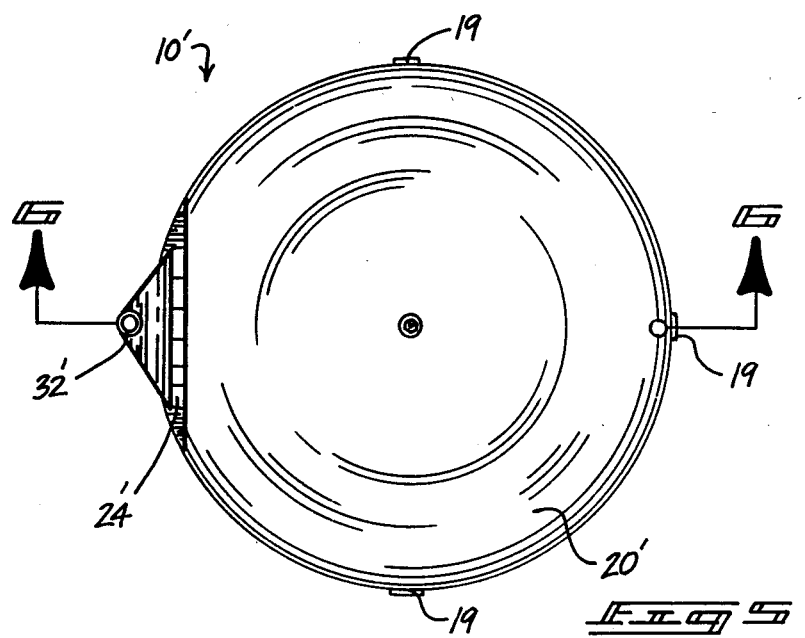

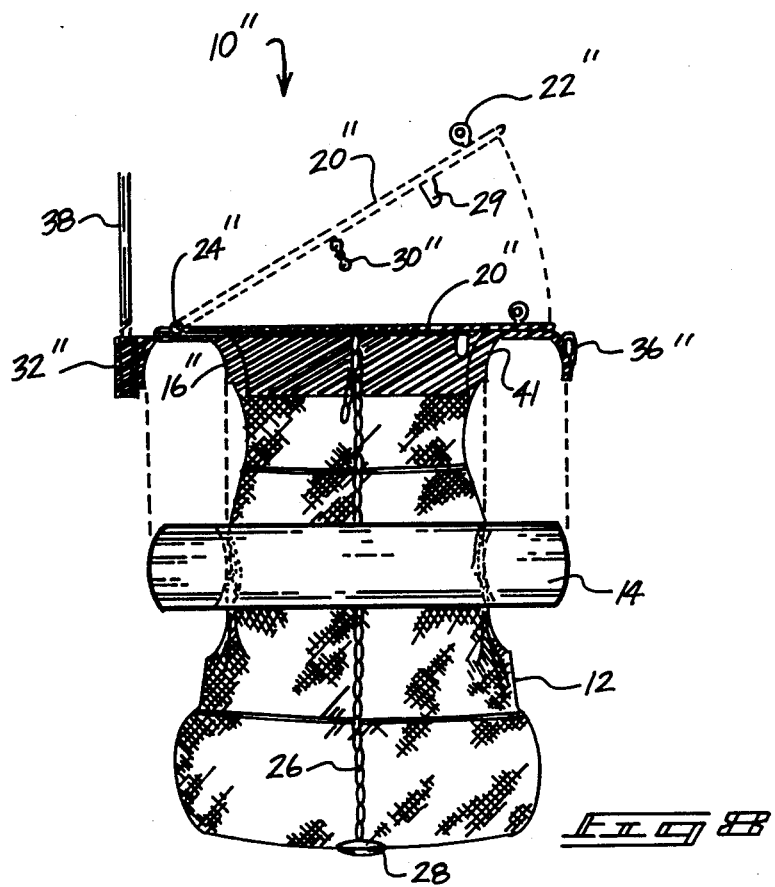
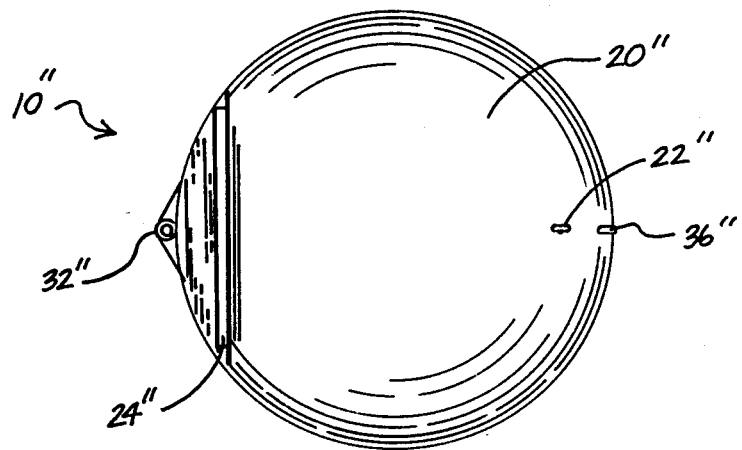

FLOATING FISH BASKET

BACKGROUND OF THE INVENTION

1. Field of the Invention

The present invention relates to floating fish baskets, and more particularly pertains to a new and improved floating fish basket for use by divers and spear fishermen to contain and protect from predators the day's catch of fish, lobster and other sea crustaceans. Spear fishing divers currently use plastic bottles, PVC plumbing pipe, inner tubes, foam tubes, bamboo trees, surf boards and a variety of other flotation devices attached to stringers or nylon nets to secure the day's catch of fish. A serious drawback of these types of stringer supports is that the catch is open to predators such as barracuda, sharks and eels. Nylon nets are disadvantageous because while although containing the catch, they are still susceptible to predator damage. Additionally, the above described devices are difficult to tow through the water. In order to overcome these problems, the present invention provides a lightweight, inexpensive, durable and easily transportable floating fish basket which utilizes a collapsible metal net to provide protection from predators.

2. Description of the Prior Art

Various types of floating fish baskets are known in the prior art. A typical example of such a floating fish basket is to be found in U.S. Pat. No. 2,241,314, which issued to P. Mohler on May 6, 1941. This patent discloses a mesh bag suspended by lacing from a flotation ring. U.S. Pat. No. 2,739,410, which issued to F. Budnick on Mar. 27, 1956, discloses a collapsible container having an accordion fold bag suspended from a flotation ring. U.S. Pat. No. 2,790,266, which issued to L. Williamson on Apr. 30, 1957, discloses a floating live bait container which has a door secured by a spring extending between an inner surface of the door and the bottom of the container. U.S. Pat. No. 3,478,463, which issued to L. Ruter on Nov. 18, 1969, discloses a floating fish basket in which a wire mesh bag is suspended from a flotation ring and is adapted for quick release therefrom by removal of a plurality of retention clips. U.S. Pat. No. 3,524,278, which issued to H. Wolfe on Aug. 18, 1970, discloses a floating fish basket in which a wire mesh bag is suspended from a flotation ring. A pivotal door having a spring closure is provided. U.S. Pat. No. D. 257,377, which issued to D. Andrews on Oct. 14, 1980, discloses a floating live bait container with a generally hexagonal configuration. U.S. Pat. No. 4,570,374, which issued to G. Baxley on Feb. 18, 1986, discloses a floating fish basket suspended from a molded foam flotation frame. A plurality of inclined baffles within an opening of the frame retain fish therein.

While the above mentioned devices are suited for their intended usage, none of these devices disclose a floating fish basket which utilizes a collapsible wire mesh bag suspended from a frame removably secured to a flotation ring and having a socket for supporting a diving flag. Additionally, none of the aforesaid devices disclose a floating fish basket having a mechanism for retaining a pivotal door closed and operative upon opening the door for partially axially collapsing a wire mesh bag. Inasmuch as the art is relatively crowded with respect to these various types of floating fish baskets, it can be appreciated that there is a continuing need for and interest in improvements to such floating fish baskets, and in this respect, the present invention addresses this need and interest.

SUMMARY OF THE INVENTION

In view of the foregoing disadvantages inherent in the known types of floating fish baskets now present in the prior art, the present invention provides an improved floating fish basket. As such, the general purpose of the present invention, which will be described subsequently in greater detail, is to provide a new and improved floating fish basket which has all the advantages of the prior art floating fish baskets and none of the disadvantages.

To attain this, representative embodiments of the concepts of the present invention are illustrated in the drawings and make use of a frame removably secured to a flotation ring. A coaxial wire mesh bag is suspended from the frame within the flotation ring for containing fish and other sea animals. The frame and mesh bag have aligned openings which may be selectively closed by a pivotal door mounted by a hinge on the frame. A chain extends between the bottom of the bag and the door and is operative upon opening the door to partially axially collapse the mesh bag to enable an individual to have access to bottom portions of the bag. The chain may be adjusted in length to shorten the axial extent of the bag for use in shallow water. A socket on the frame is provided for mounting a staff of a diving flag. The flotation ring may be captured between upper and lower frame members secured by threaded fasteners or alternatively secured by frictional engagement within a frame recess or held in place by VELCRO fastening straps.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved floating fish basket which has all the advantages of the prior art floating fish baskets and none of the disadvantages.

It is another object of the present invention to provide a new and improved floating fish basket which may be easily and efficiently manufactured and marketed.

It is a further object of the present invention to provide a new and improved floating fish basket which is of a durable and reliable construction.

An even further object of the present invention is to provide a new and improved floating fish basket which is susceptible of a low cost of manufacture with regard to both materials and labor, and which accordingly is then susceptible of low prices of sale to the consuming public, thereby making such floating fish baskets economically available to the buying public.

Still yet another object of the present invention is to provide a new and improved floating fish basket which provides in the apparatuses and methods of the prior art some of the advantages thereof, while simultaneously overcoming some of the disadvantages normally associated therewith.

Still another object of the present invention is to provide a new and improved floating fish basket which utilizes a collapsible wire mesh bag suspended from a frame which is removably secured to a flotation ring.

Yet another object of the present invention is to provide a new and improved floating fish basket which provides a socket for supporting the staff of a diving flag.

Even still another object of the present invention is to provide a new and improved floating fish basket which utilizes a wire mesh bag suspended from a frame and provided with a pivotal door and a mechanism for retaining the door closed and operative upon opening the door for partially axially collapsing the mesh bag to provide convenient access.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent When consideration is given to the following detailed description thereof. Such description makes reference to the annexed drawings wherein:

FIG. 3 is a side view of the floating fish basket according to the first embodiment of the present invention, in a collapsed condition.

FIG. 4 is an exploded view, partially in cross section, illustrating the manner of assembly of the floating fish basket according to the first embodiment of the present invention.

FIG. 5 is a top view of a slightly modified form of floating fish basket according to a second embodiment of the Present invention.

FIG. 6 is a side view, partially in cross section, taken along line 6—6 of FIG. 5, illustrating the floating fish basket according to the second embodiment of the present invention.

FIG. 7 is a top view, illustrating a floating fish basket according to a modified third embodiment of the present invention.

FIG. 8 is a side view, partially in cross section, illustrating the floating fish basket according to the modified third embodiment of the present invention.

DESCRIPTION OF THE PREFERRED EMBODIMENT

Figure 1:
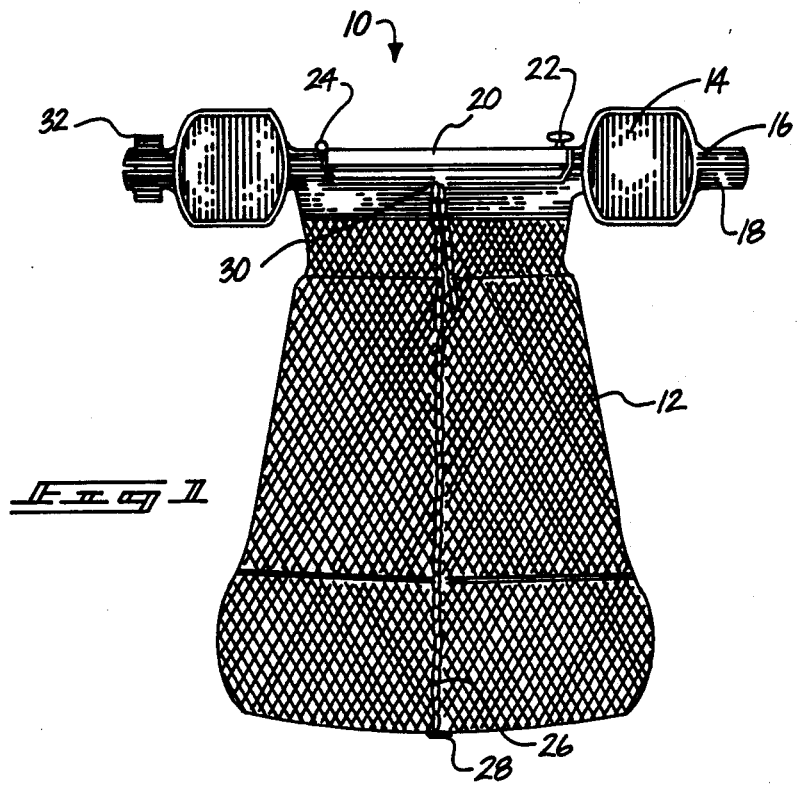
FIG. 1 is a side view, partially in cross section, illustrating the floating fish basket according to a first embodiment of the present invention.

With reference now to the drawings, and in particular to FIG. 1 thereof, a new and improved floating fish basket embodying the principles and concepts of the present invention and generally designated by the reference numeral 10 will be described.

More specifically, it will be noted that the first embodiment 10 of the invention includes a collapsible wire mesh bag 12 which is suspended centrally within a flotation ring 14 captured between upper 16 and lower 18 overlying frame members having juxtaposed generally semi-cylindrical annular recesses. A pivotal door 20 is mounted by a hinge 24 on the upper frame member 16 and is provided with a handle 22. A chain 26 is secured at a bottom portion 28 of the mesh bag 12 and to a clip 30 on an inner surface of the door 20. The weight of the bag 12 on the chain 26 serves to retain the door 20 in the illustrated closed position, and on opening the door 20 by manipulation of the handle 22, the chain 26 causes the mesh bag 12 to be axially collapsed allowing access to the lower portion thereof. Additionally, by adjustment of the length of the chain 26, the bag 12 may be partially collapsed to allow use while wading in shallow water without dragging the bottom of the net across the ocean bottom. A cylindrical socket 32 is formed through the upper 16 and lower frame members 18 for frictional engagement with the staff 38 of a conventional diving flag, as shown in FIGS. 4 and 8.

Figure 2:
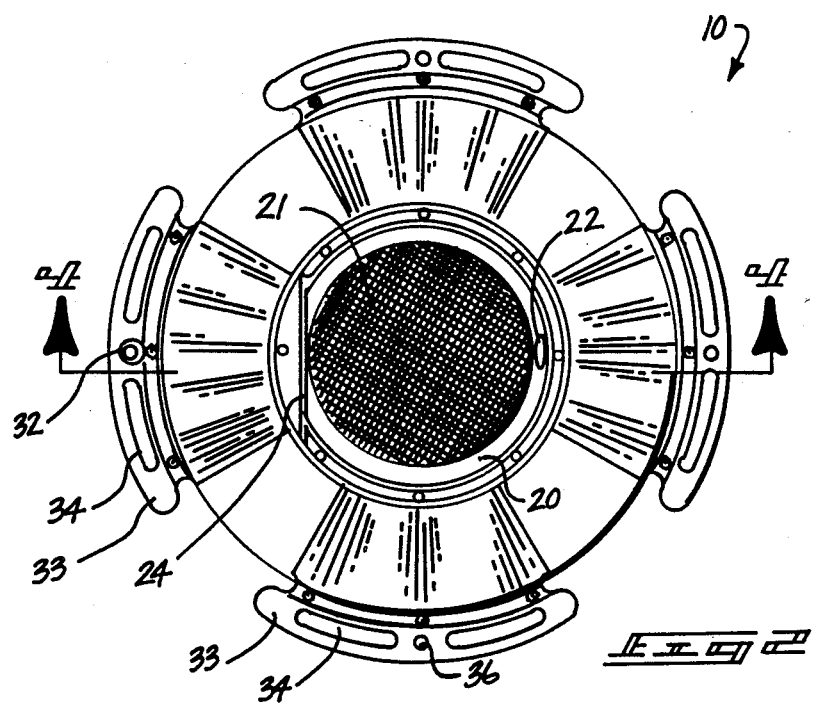
FIG. 2 is a top view of the floating fish basket of the first embodiment of the present invention.

As shown in the top view of FIG. 2, a plurality of circumferentially spaced radial projections 33 are provided, each having hand grip slots 34 and an eyelet 36 for attachment of a tether line for use in towing the device by a diver.

FIG. 3 illustrates a side view of the floating fish basket 10 according to the first embodiment of the present invention, with the mesh bag 12 in a collapsed condition for storage and transportation.

FIG. 4 provides an exploded view which illustrates the manner of assembly of the various components. The upper 16 and lower frame members may be secured utilizing conventional threaded fasteners 15.

FIG. 5 illustrates a top view of a slightly modified alternative embodiment 10' of the floating fish basket of the present invention. The pivotal door 20' is secured by a hinge 24' to an upper frame member. The door 20', hinge 24' and slide staff socket 32' are all preferably molded from a plastic material. A plurality of VELCRO fasteners 19 are circumferentially spaced around the device for a purpose to be described subsequently.

As shown in FIG. 6, the flotation ring 14 is adapted for securement by a plurality of circumferentially spaced VELCRO fastening straps 17 which cooperate with the spaced VELCRO fasteners 19. This provides a convenient and quick attachment mechanism for the flotation ring 14 which allows, in an emergency situation, the flotation ring 14 to be detached from the mesh bag 12. A support ring 35 secured to the frame within the flotation ring 14 supports a plurality of rings 37 attached around the top opening of the bag 12.

FIG. 7 provides a top view of a modified third embodiment 10'' of the floating fish basket of the present invention.

The pivotal door 20'' is secured by a hinge 24'' on the frame. The slide staff socket 32'' may be integrally molded from a plastic material with the frame member.

The door handle 22'' is positioned diametrically opposite the hinge 24'' to provide for maximum leverage in opening the door 20''. An eyelet 36'' is secured on the frame diametrically opposite the flag socket 32'' for attachment of a tether line for use in towing by a diver.

As shown in FIG. 8, the frame member 16'' is formed from a flexible plastic material and is provided with a generally semi-cylindrical annular recess 41 dimensioned for frictional engagement with the flotation ring 14. Through this construction, the flotation ring 14 may be quickly and easily detached from the mesh bag 12 for use in emergency situations by popping it out of the recess 41. The door 20'' is provided with a resilient plastic catch 29 which frictionally engages an interior portion of the frame 16'' for securing the door in a closed position.

As may now be appreciated from the above description and reference to the accompanying drawings, the present invention provides a floating fish basket which may be utilized by spear fishermen and divers to store and transport a day's catch of various sea animals.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A floating fish basket, comprising:
   a frame formed from a flexible plastic material and having a downwardly opening generally semi-cylindrical annular recess;
   a flotation ring dimensioned for frictional engagement within said semi-cylindrical annular recess of said flotation ring, said flexible frame elastically deformable for removably retaining said flotation ring in said recess;
   an eyelet on said frame for securing a tether line;
   a hollow cylindrical socket on said frame for supporting a staff of a diving flag;
   a collapsible wire mesh bag suspended from said frame within said flotation ring;
   said frame and said mesh bag having aligned openings within said flotation ring;
   a pivotal door on said frame for selectively closing said aligned opening;
   a link chain having one end secured to a bottom of said mesh bag; and
   a clip on an inner surface of said pivotal door secured to a selected link of said link chain, said clip selectively positionable to allow adjustment of an axial extent of said mesh bag and to cause said mesh bag to axially collapse upon opening of said door.

2. A floating fish basket, comprising:
   a frame formed by upper and lower overlying frame members having juxtaposed generally cylindrical annular recesses;
   a flotation ring received in said annular recesses and captured between said upper and lower frame members;
   a plurality of threaded fasteners securing said upper and lower frame members in overlying relation;
   a plurality of circumferentially spaced overlying radial projections on said upper and lower frame members, said projections having hand grip apertures and eyelets for securing a tether line;
   a hollow cylindrical socket on said frame for supporting a staff of a diving flag;
   a collapsible wire mesh bag suspended from said lower frame within said flotation ring;
   said upper and lower frame members and said mesh bag having aligned openings within said flotation ring;
   a pivotal door on said upper frame member for selectively closing said aligned openings;
   a link chain having one end secured to a bottom of said mesh bag; and
   a clip on an inner surface of said pivotal door secured to a selected link of said link chain, said clip selectively positionable to allow adjustment of an axial extent of said mesh bag and to cause said mesh bag to axially collapse upon opening of said door.

* * * * *